Nov. 2, 1965  B. WATKINS  3,214,859
FISHING TACKLE
Filed June 19, 1963
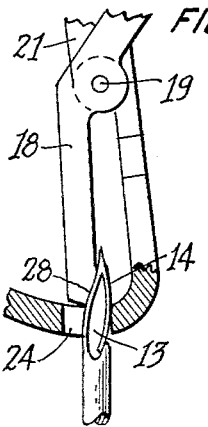
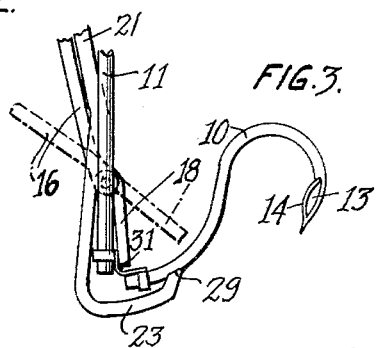
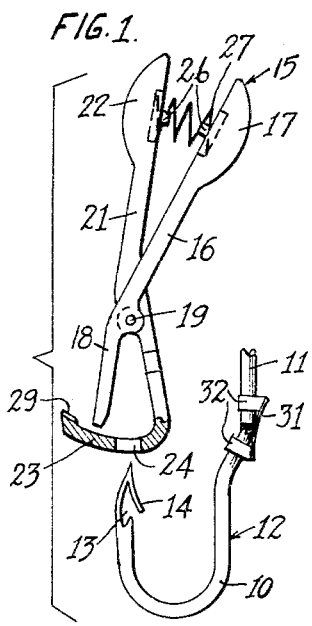
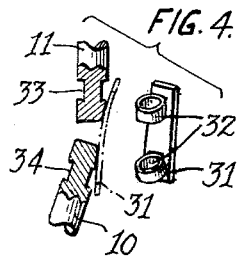
INVENTOR.
BERNARD WATKINS
BY
John J. Lynch
Atty.

3,214,859
FISHING TACKLE
Bernard Watkins, Culver Lake, Branchville, N.J.
Filed June 19, 1963, Ser. No. 288,969
7 Claims. (Cl. 43—43.16)

This invention relates to fishing tackle and in particular to a form thereof in which a fish may be very easily unhooked.

One of the main objects of the invention is to provide an implement which can by use of the lever principle push the pointed end of a fish hook out of its entanglement in the fish tissue and at the same time invert this end so that the fish may be very easily unhooked.

A further object is to provide a fish hook with individual shank and hook portions, hinged together, so that the shank portion acts as a seat for one arm of a releasing implement, while the opposing arm, provided with a spur, acts to push the hook point out of the entangling fish tissue and to invert this hook point, so that the hook may be easily removed from the fish.

For an understanding of this invention it is necessary to consider the great force inherent in tongs, pliers, nut crackers, forceps and the like because of double use of the lever principle.

Another object is to provide a barb that can be rendered ineffective as a fish imprisoning agent so that the fish in leaving the hook will be damaged as little as possible.

A still further object of the invention is to provide a device of the character referred to which permits easy and quick release of the fish from the hook for any desired reason, such as return to the water because of illegal size.

It is well know that fish are caught, tagged and released for a study of their migratory habits and breeding and to this end another object of the invention is to provide equipment that will afford pleasure to the sportsman in catching fish and at the same time will provide means for releasing the fish with a minimum of damage.

Further objects of the invention include the use of a barbed hook in which the barb can be rendered incapable of damaging the tissue or of being an impediment to the removal of the hook from the mouth of the fish; the provision of a simple element for the purpose of rendering the hook removable from the tissue and so that its fish catching property will not be impaired; the provision of novel means for rendering the barb harmless or for removing it from the hook, upon which it can be subsequently replaced for further use; and the provision of an implement that is of novel and simple construction, requires little effort in its manipulation and can be quickly and conveniently used to release the fish from the hook.

With these and other objects in view, the invention comprises certain constructions hereinafter described and then particularly pointed out in the claims and a preferred embodiment of my invention is illustrated in the accompanying drawings, in which:

FIGURE 1 is a combination view showing the barb end of a fish hook ready to be moved into one of the arms of a releasing implement, the hook barb being shown in open position, FIGURE 2 is a view similar to FIGURE 1 showing the action of the releasing implement in closing the barb to render it non-damaging to the tissue of the fish and to eliminate the effectiveness of the barb as an impediment to the removal of the fish, FIGURE 3 is a view showing the action of the implement in moving the hook to fish drop-off position during which the hook will retract through the passage made when the fish tissue was originally pierced and FIGURE 4 is a combinational view showing the means for yieldably connecting the upper and lower shank portions of the hook, the parts being separated for clarity.

Referring to the drawings in detail, numeral 10 indicates the hook portion and 11 the shank portion of a fishing hook which will be designated as a whole as at 12. As usual, the hook is secured to a leader which in turn is attached to the line, neither the line or the leader being shown as these means are well known. In the form of the invention shown in FIGURE 1, the barbed end of the hook portion 10 is shaped to provide a pocket 13 and a pointed barb 14, the latter of which is tempered to be flexibly bent as shown in FIGURE 2 to snap and be yieldably held in the pocket 13, thus providing a closed position so that the hook can be withdrawn through the fish tissue and through the bore made by the hook in impaling the fish. After impalement the barb end of the hook usually projects outside the tissue of the fish so that a release implement may be employed without the need of having to further pull on the hook to get it all of the way out of the tissue.

A release implement 15 consists of a tong structure including an arm 16 terminating at opposite ends in a handle 17 and a camming foot 18, the arm 16 being pivoted as at 19 to another arm 21 having a handle 22, similar to handle 17, at its upper end and a spoon shaped foot 23 at its lower end. The foot 23 is shaped to provide a slot 24 into which passes the barb of the hook when the latter is drawn up or when the implement is lowered thereover, the latter being the preferred use. The inner faces of the handles 17 and 22 are provided with suitable recesses and concentric stop projections 26 surrounded by a coil spring 27 bearing on the faces to exert outward pressure on the arms and normally keep the lower portions of the tong structure apart when the implement is not in use.

When the barb projects or nearly projects through the tissue of the fish, the implement is pressed down with the foot 23 against the fish and the hook pulled on slightly until the barb end of the hook enters the opening 24. When the implement is grasped in the hand the handles are brought together to a closed position against the resistance of the spring 27 to a limit provided by the stops 26 which act to position the cam surface 28 in position to force the barb 14 into contact with the end of the slot 24 so that the movement of the hook end relatively to the implement will close the barb by causing its end to snap into a pocket or recess 13 as clearly illustrated in FIGURE 2. When the barb is closed the implement is reversed in position and placed so that a foot end 29 on foot 23 engages the hook portion 10 to push the same up and cause it to hinge in an arcuate movement to what constitutes a fish drop-off position FIGURE 3, so that the hook will pass back through the bore made as the fish was impaled. This hinge movement is made possible by a self closing hinge strip 31 having integral clamping sleeves or bands 32 secured thereon in position to seat in annular grooves 33 and 34 in the adjacent ends of the shank and hook portions 11 and 10 respectively. The sleeves 32 hold the strip 31 securely against the hook structure and allow the shank and hook portions to assume the relative positions shown in FIGURE 3 as the hook is withdrawn from the fish tissue or as the fish drops off the hook, without damage, due to the closed barb.

It is evident therefore that I have provided an easy to use and simple fishing tackle combination that is of advantage in the sport of fishing and in fish conservation practice and one that can be conveniently applied to the hook so that a slippery fish can be easily removed from the hook without handling and with a minimum of damage to the tissue of the fish.

My invention is not to be restricted to the precise details of construction shown since various changes and modifications may be made therein without departing from the scope of the invention or sacrificing the advantages to be derived from its use.

What I claim is:

1. In a device of the character described, in combination, a fish hook, a barb adjacent the end of the hook for securing a fish on the hook, said hook having a hinged end portion, an implement adapted to be engaged with said hook, means on the implement for engaging said barb to render it ineffective as a fish securing means, and means on the implement for moving the hinged end portion of said hook to a fish drop off position.

2. In a device of the character described, in combination, a fish hook having relatively hinged hook and shank portions, a barb on said hook portion adjacent the end thereof, and an implement for engaging the fish tissue to expose and engage the hook portion to render said barb ineffective as a fish securing means and to push said hook portion to a fish drop off position.

3. In a device of the character set forth in claim 1 in which said implement is usable in one position to render the barb ineffective and is usable in another position for moving the hook end to fish drop off portion, and limit stops for controlling the operation of the implement in said one position.

4. In a device of the character set forth in claim 1, in which said implement comprises a tong structure presenting leg portions one of which is shaped to provide an opening into which the barb is projected, the other leg of the structure having a cam portion thereon for engagement with the end of the hook, and stop means associated with the tong structure for positioning the cam portion with respect to said opening to render the barb ineffective.

5. In a device of the character set forth in claim 1, in which the barbed end of said hook is shaped to provide a recess into which said barb may be snapped for closing, and said implement barb engaging means having a slot for receiving the end of the hook for the closing of said barb upon operation of said implement means.

6. In a device of the character set forth in claim 5 including a cam end on said implement means for guiding the end of the hook in said recess to close the barb.

7. In a device of the character set forth in claim 6, including stop means on the implement for positioning the cam end of the implement with respect to said recess in barb closing operation.

References Cited by the Examiner
UNITED STATES PATENTS

| | | | |
|---|---|---|---|
| 802,445 | 10/05 | Evans | 43—43.16 |
| 2,217,928 | 10/40 | Ward | 43—43.16 |
| 2,725,656 | 12/55 | Schmidt | 43—6 |
| 2,753,643 | 7/56 | Recker | 43—6 |
| 2,807,495 | 9/57 | Pillstrom | 43—53.5 X |
| 2,815,603 | 12/57 | Bandemer | 43—43.16 |
| 2,861,383 | 11/58 | Gray | 43—43.16 X |
| 2,861,384 | 11/58 | Kubin | 43—53.5 |
| 2,862,327 | 12/58 | Steinhauser | 45—53.5 |
| 2,887,817 | 5/59 | Sharpe | 43—53.5 |
| 2,911,752 | 11/59 | Leppich | 43—43.16 X |
| 2,984,041 | 5/61 | Banker | 43—43.16 |

SAMUEL KOREN, *Primary Examiner.*